(No Model.)

S. M. SCHINDEL.
SHIELD FOR PNEUMATIC TIRES.

No. 521,005. Patented June 5, 1894.

Witnesses
J. G. Meyers Jr.
Robt Evertt

Inventor
S. Milford Schindel
By Chas. B. Tilden
Attorney

UNITED STATES PATENT OFFICE.

SAMUEL MILFORD SCHINDEL, OF HAGERSTOWN, MARYLAND.

SHIELD FOR PNEUMATIC TIRES.

SPECIFICATION forming part of Letters Patent No. 521,005, dated June 5, 1894.

Application filed November 4, 1893. Serial No. 489,999. (No model.)

*To all whom it may concern:*

Be it known that I, SAMUEL MILFORD SCHINDEL, a citizen of the United States, residing at Hagerstown, in the county of Washington and State of Maryland, have invented new and useful Improvements in Protective Shields or Cushions for Pneumatic Tires for Bicycles, of which the following is a specification.

My invention relates to the construction of pneumatic tires for bicycles, the purpose thereof being to provide the air-inflated tube with an efficient protection against puncture.

It is my purpose, also, to provide a protective shield, or cushion, which may be combined with the pneumatic tire in any preferred manner, which shall possess great power of resistance to the penetration of sharp points, or edges, such as nails, pieces of glass, sharp stones or other objects, which shall be flexible and pliable, and which may be manufactured at an extremely low cost, and combined with, or incorporated in the pneumatic tire without materially increasing the cost of producing the latter.

My invention consists, to these ends, in the novel parts and combinations of parts hereinafter fully described and then particularly pointed out and described in the claims following this specification.

To enable others skilled in the art to which my invention pertains to fully understand and to make, construct and use the same, I will now describe said invention in detail, reference being had to the accompanying drawings, in which—

Figure 2:
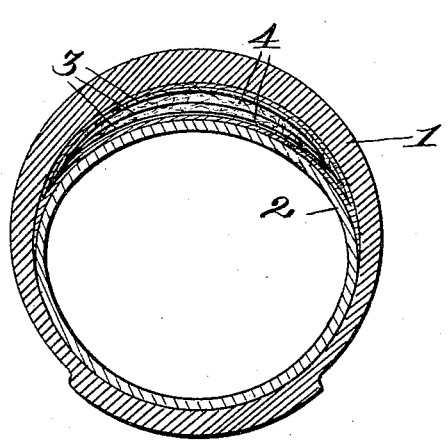
Figure 3:
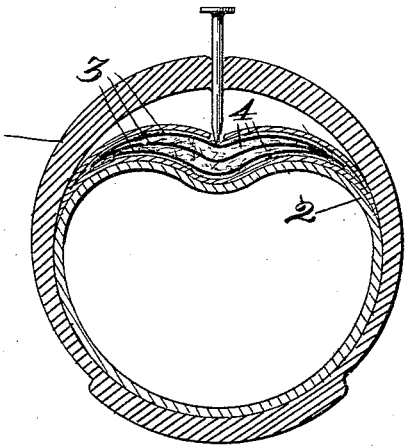
Figure 1:
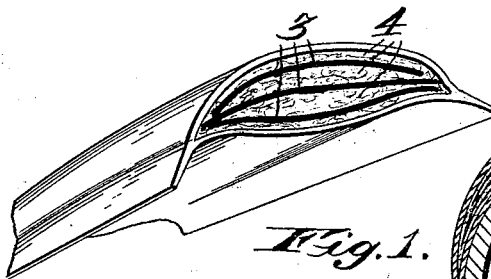
Figure 5:
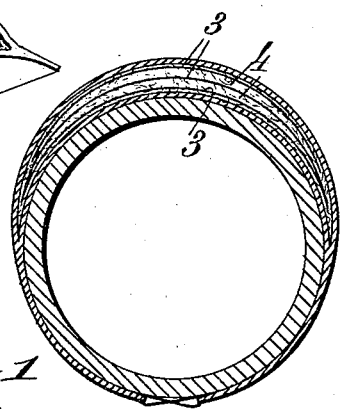
Figure 4:
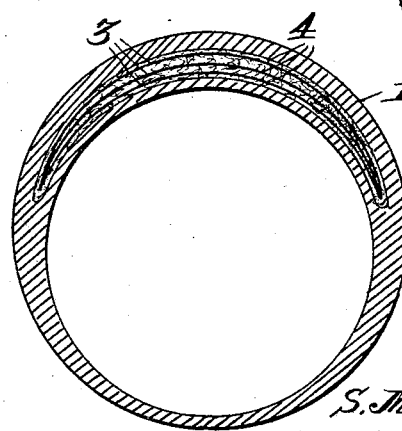

Figure 1, is a view in transverse section, partly in perspective, of a portion of the pocket, or casing, containing the puncture-proof cushion, or shield, the parts composing the same being shown as they appear prior to compression of the same. Fig. 2, is a transverse section of the pneumatic tire showing one method of combining the puncture-proof cushion or shield, with said tire. Fig. 3, is a similar view showing the manner in which the cushion, or shield, yields under the action of a sharp point, or edge, penetrating the external casing. Fig. 4, is a transverse section showing one method of incorporating the puncture-proof cushion, or shield, in the body of the pneumatic tire. Fig. 5, is a view showing the application of the shield to a specific form of pneumatic tire.

In the said drawings the reference-numeral 1 indicates the pneumatic, or air-inflated tire, which may be constructed from any preferred material. For example the external covering, or casing, may be formed of any suitable textile fabric, surfaced with, or having incorporated in its substance, india-rubber, or a compound thereof, vulcanized to the required degree of toughness and elasticity, or any other material, or compound, may be employed which is adapted to the purpose. The internal tube, if a separate casing is used, may be of rubber, or a compound of the same, though I may use any other material which will possess the necessary qualities.

To fully protect the internal casing 2, which receives and retains the air, and to secure the same from all danger of being punctured, or ruptured by sharp points, or edges, which may penetrate the outer envelope or casing, I provide a shield, or cushion, composed of one or more of layers 3, of any suitable textile fabric, such for example, as muslin, linen, canvas, or other substance, and with the same I combine alternate layers of raw cotton 4. The textile fabric or material is impregnated with pine-tar, or other compound of tar, with which the layers of textile fabric may be more or less completely saturated. They are then sprinkled with pulverized resin and after being arranged in alternation with the layers of raw cotton 4 the whole is united by heat and pressure into a practically homogeneous mass, having small bulk but possessing great toughness while it also has remarkable pliability. Such a shield or cushion, affords a perfectly flexible and practically impervious protective shield to the inner casing, or to that portion of the tire containing the inflating body of air.

The shield or cushion, constructed as described, may be combined with, or incorporated in, the pneumatic tire in any preferred manner. For example, it may be placed between the outer casing 1 and an inner casing containing the inflating body of air, or it may be incorporated in the body of pneumatic tire, as shown in Fig. 4. In either case, it need extend only over that portion which is directly, or indirectly, exposed to injury, puncture, or other injury.

No special mechanism is required in compressing the cushion, or shield, in the presence of heat, as I may employ any ordinary form of rolls, heated internally by gas, or other suitable means, or any apparatus suitable for the purpose may be used instead of rolls.

My invention is capable of being used in combination with any known form of pneumatic tire, without material change in the latter.

I may employ as a substitute for the raw-cotton, any other fibrous material which will answer the same purpose.

The protective shield may be used with the ordinary "hose-pipe" pneumatic tire, shown in Fig. 5, by merely applying it to the exterior thereof, the lateral flaps being extended sufficiently to surround the tire, or nearly so, and receive a lacing or other suitable fastening.

What I claim is—

1. A pneumatic, or air-inflated tire having a protective cushion, or shield, composed of alternate layers of raw cotton and textile fabric, the latter being impregnated with tar and treated with powdered resin, and the whole united by heat and pressure, substantially as described.

2. The combination with a pneumatic, or air-inflated tire, of a protective shield, or cushion, consisting of a plurality of layers of textile fabric and raw cotton, the former being impregnated with pine-tar and treated with resin, and the whole being united under combined heat and pressure, substantially as described.

3. A protective shield or cushion for pneumatic tires, the same consisting of one or more layers of textile fabric, alternating with one or more layers of raw cotton, the textile fabric being treated with tar and powdered resin and the whole united under heat and pressure, substantially as described.

4. The combination with a pneumatic tire of a protective cushion, or shield, consisting of one or more layers of textile fabric alternating with one or more layers of such fibrous material as raw cotton, the textile fabric being treated with tar and powdered resin and the whole united under heat and pressure, the shield so formed being attached to the lateral portions of the tire and detached from the bearing face, or portion, substantially as described.

In testimony whereof I affix my signature in presence of two witnesses.

S. MILFORD SCHINDEL.

Witnesses:
EWELL A. DICK,
CHAS. B. TILDEN.